United States Patent [19]

Foster et al.

[11] 3,938,777

[45] Feb. 17, 1976

[54] CONTROL VALVES

[75] Inventors: Thomas Vincent Foster; Frank Alan Fenton, both of Doncaster, England

[73] Assignee: Emhart Corporation, Farmington, Conn.

[22] Filed: Aug. 5, 1974

[21] Appl. No.: 494,656

[30] Foreign Application Priority Data

Aug. 10, 1973 United Kingdom............... 37910/73

[52] U.S. Cl. ................ 251/82; 137/454.6; 137/269
[51] Int. Cl.²......................................... F16K 31/50
[58] Field of Search ......... 251/82, 83, 85, 227, 276; 137/269–271, 454.5, 454.6, 522, 523

[56] References Cited
UNITED STATES PATENTS

| | | | |
|---|---|---|---|
| 1,575,449 | 3/1926 | Mozian | 251/227 X |
| 1,602,118 | 10/1926 | Mortimer | 137/454.5 |
| 1,971,186 | 8/1934 | Kornas | 251/276 |
| 2,245,757 | 6/1941 | Cazenave | 251/276 |
| 3,420,493 | 1/1969 | Kraft | 251/82 |
| 3,589,671 | 6/1971 | Strache | 251/83 |

FOREIGN PATENTS OR APPLICATIONS

| | | | |
|---|---|---|---|
| 891,517 | 12/1943 | France | 251/227 |
| 618,611 | 2/1949 | United Kingdom | 251/276 |

Primary Examiner—Henry T. Klinksiek
Attorney, Agent, or Firm—Laurence A. Savage

[57] ABSTRACT

Three flow control valves are described, each of which incorporates a sleeve having a double conical valve seat and at least one frusto-conical valve member mounted on a support stem in a valve bore between first and second ports. In the first and second flow control valves, a restricted flow of fluid in one direction and substantially unrestricted flow in an opposite direction between the ports is obtained. The third control valve is provided with two valve members, and controlled flow rates in both directions between the ports are obtained. Any one of the control valves is readily converted into either of the other control valves and a total of only seventeen different parts is needed to construct any one of the valves.

12 Claims, 3 Drawing Figures

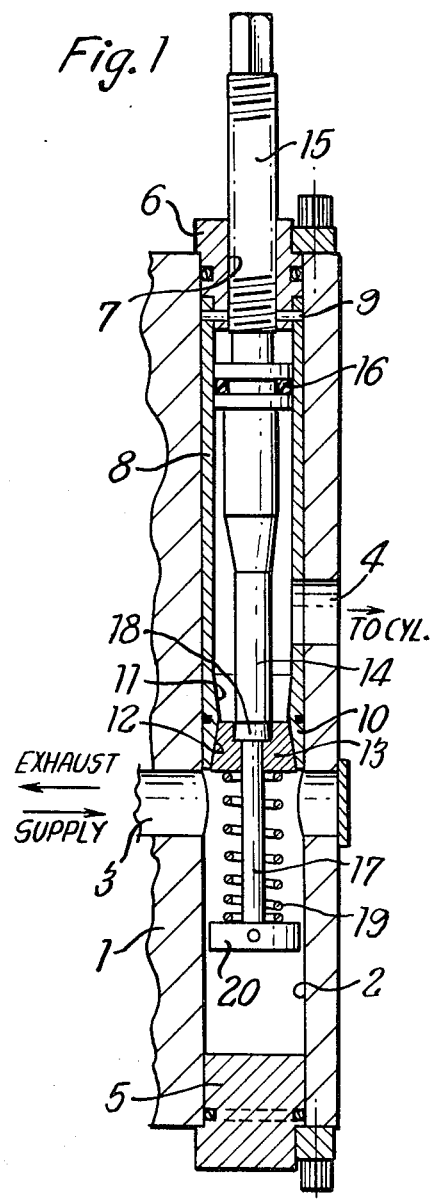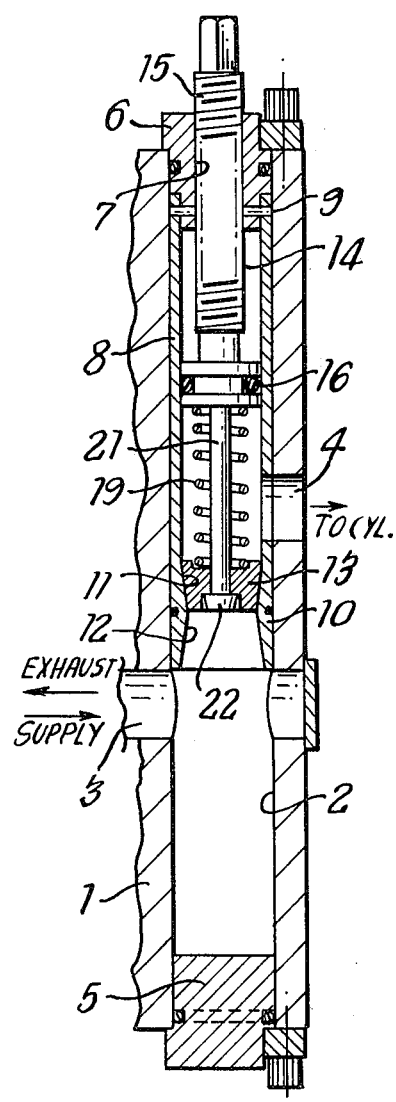

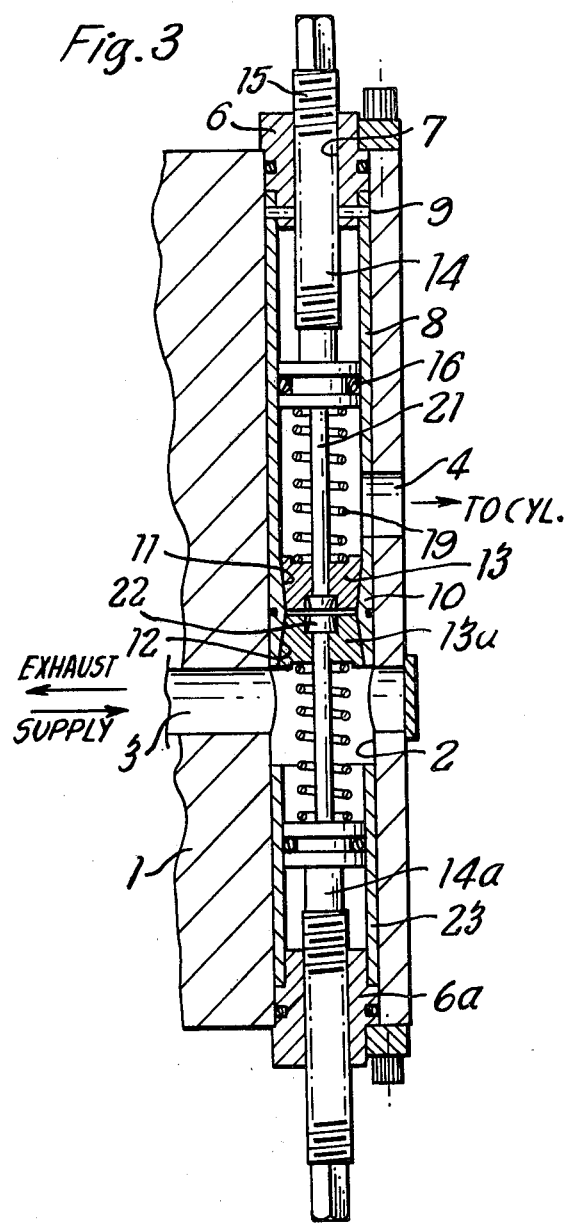

3,938,777

CONTROL VALVES

SUMMARY OF THE INVENTION

A flow control valve incorporates a sleeve having a double conical seat located in a valve bore between first and second ports which are, respectively, a supply/exhaust port and an outlet port leading to an air-operated device. A valve member capable of engaging with either of the seats is carried by a support stem which is adjustably mounted in one end of the bore. In a first embodiment the valve member is situated on the opposite side of the double conical seat from the mounting means for the support stem and rotation of the support stem in its mounting means positions the valve member relative to the second seat so that there is a controlled supply of air to the device. The valve member is resiliently maintained in this position so that it will yield under exhaust pressure from the cylinder to permit an essentially unrestricted flow of exhaust air. In a second embodiment the valve member is positioned on the same side of the double conical seat as the mounting means and co-acts with the first valve seat to control the flow of exhaust air from the device whilst permitting an unrestricted supply of air to the device. In a third embodiment the means by which the valve member is positioned in relation to the first valve seat is duplicated at the opposite end of the valve bore so that a second similar valve member co-acts with the second valve seat and the valve provides for control of the flow of both supply air and exhaust air, the two controls being independent of one another.

The constructions of the various embodiments of the flow control valve are such that the majority of the valve parts may be used in any of the embodiments with the result that great flexibility in manufacture is provided by the ability to assemble three valves for different purposes from relatively few valve parts.

Flow control valves in accordance with the present invention have particular application in glassware forming machines, and more particularly in conjunction with the valve block of co-pending U.S. patent application Ser. No. 523,784, filed Nov. 13, 1974 of T. V. Foster et al., assigned to the assignee of the present invention, which is a continuation of Ser. No. 369,693, filed June 13, 1973, now abandoned. The flow control valves of the present invention may be used instead of conventional spring check valves and ball check valves which provide one-way control of flow through the valve, and, if preferred, two-way control of flow through the valve may be provided by the use of a suitable flow control valve in accordance with the present invention.

BRIEF DESCRIPTION OF DRAWINGS

In the drawings:

FIG. 1 is a longitudinal cross-sectional view of a flow control valve for giving controlled fluid flow into an actuating device and unrestricted exhaust flow from the device;

FIG. 2 is a longitudinal cross-sectional view of a flow control valve for giving unrestricted fluid flow into an actuating device and controlled exhaust flow from the device; and FIG. 3 is a longitudinal cross-sectional view of a flow control valve for giving controlled fluid flow in both the supply to and the exhaust from an actuating device.

In the drawings the same or similar parts are designated by like reference numerals.

DETAILED DESCRIPTION

Referring to FIG. 1, there is shown a valve housing 1 having a valve bore 2 therein and two ports 3 and 4 which communicate with the bore 2. The valve bore 2 is closed at one end by means of a solid plug 5 and at the other end by means of a plug 6 which is provided with a threaded bore 7 and which constitutes adjustable mounting means. A sleeve 8 is mounted within the valve bore 2 and is secured to the plug 6 by means of a nylon pin 9. At the end of the sleeve 8 which is remote from the nylon pin 9, the sleeve 8 is provided with a double conical seat 10 which provides a pair of valve seats 11 and 12, each having a frusto-conical surface. The double conical seat 10 is located between the two ports 3 and 4.

A valve bobbin 13 having a frusto-conical surface which is capable of mating with the frusto-conical surface of either of the valve seats 11 and 12 is slidably mounted within the bore 2 upon a support stem 14. In the embodiment of FIG. 1 the valve bobbin 13 is slidably mounted on the support stem 14 between the port 3 and the valve seat 12. The support stem 14 which extends longitudinally within the bore 2 includes a screw portion 15 which coacts with the threaded bore 7 in the plug 6 so that the support stem 14 is adjustably mounted in the plug 6 for longitudinal movement relative to the valve bore 2 as a result of rotation of the support stem 14, for example manual rotation through a knurled knob not shown in the drawings. The support stem 14 is also provided with an air seal 16 positioned in the bore 2 between the port 4 and the plug 6.

The valve bobbin 13 is slidably mounted on a portion 17 of the support stem 14 which is of reduced diameter in comparison with the remainder of the support stem 14. The valve bobbin 13 is urged into contact with a stop 18, which is a shoulder formed by the junction between the main portion of the support stem 14 and one end of the portion 17 of reduced diameter, by means of a compression spring 19 which acts at one end against the valve bobbin 13 and at the other end against an end stop 20 which is present at that end of the support stem 14 which is remote from the plug 6.

The port 3 of the control valve is connected alternatively to an air supply and an exhaust system by means of a suitable valve means (not shown) and the other port 4 is connected to a cylinder which is operable by air pressure. Rotation of the support stem 14 in the plug 6 causes the support stem 14 to be moved longitudinally relative to the bore 2 and the sleeve 8. Consequently the stop 18 on the support stem 14 is moved longitudinally with the result that the valve bobbin 13 is moved out of engagement with the valve seat 12 so that, when the port 3 is connected to an air supply, a controlled rate of flow of air to the port 4 is obtained. The rate of flow of air to the port 4 may be regulated by adjusting the position of the valve bobbin 13 relative to the valve seat 12 by further rotation of the support stem 14.

When the port 3 is connected to an exhaust system, exhaust air pressure exerted through port 4 against the valve bobbin 13 overcomes the force exerted by the spring 19. Thus a substantially unrestricted flow of air to exhaust is permitted by the flow control valve of FIG. 1.

In FIG. 2 there is shown a flow control valve having parts essentially similar to the flow control valve of FIG. 1, except that the valve bobbin 13 is slidably mounted on the support stem 14 between the valve seat 11 and the port 4. In consequence the support stem 14, in place of the portion 17 of FIG. 1, has a reduced portion 21 upon which the valve bobbin 13 is slidably mounted between the air seal 16 and an end stop 22. The valve bobbin 13 is urged against the end stop 22 by means of the compression spring 19, which in this embodiment acts between the valve bobbin 13 and the air seal 16.

When the port 3 is connected to an air supply, air pressure against the valve bobbin 13 overcomes the force exerted by the spring 19 and a substantially unrestricted flow of air to the port 4 is permitted. On the other hand, when the port 3 is connected to an exhaust system, the flow of air from the port 4 to the exhaust system is regulated according to the position of the valve bobbin 13 relative to the valve seat 11. This position may be adjusted by rotation of the support stem 14 in the plug 6.

The flow control valve illustrated in FIG. 3 includes all of the parts of the control valve of FIG. 2 with the exception of the solid plug 5. The solid plug 5 is replaced with a plug 6a which is similar to the plug 6 in FIGS. 1 and 2. A second sleeve 23 is mounted within the bore 2 and is secured to the plug 6a in the same way as the sleeve 8 is secured to the plug 6. A support stem 14a which is similar to the support stem 14 of FIG. 2 has a valve bobbin 13a, which is similar to valve bobbin 13, slidably mounted thereon. The position of the valve bobbin 13a relative to the valve seat 12 may be adjusted by the rotation of the support stem 14a.

When the port 3 is connected to an air supply, the flow of air is regulated by the position of the valve bobbin 13a relative to the valve seat 12 since the air pressure against the valve bobbin 13 will overcome the force exerted by the spring 19 allowing substantially unrestricted flow of air past the valve bobbin 13. When the port 3 is connected to an exhaust system, the flow of air from the port 4 to the exhaust system is regulated by the position of the valve bobbin 13 relative to the valve seat 11. The pressure of air against the valve bobbin 13a is sufficient to displace the valve bobbin 13a and hence flow of air from the port 4 to the port 3 is substantially unimpeded by the valve bobbin 13a.

In each of the embodiments shown, once the support stem 14 has been adjusted to the desired position, the frictional resistance of the nylon pin 9 pressing against the screw portion 15 is sufficient to hold the support stem 14 in the desired position. Support stem 14a of the embodiment of FIG. 3 is similarly held in the desired position in plug 6a.

The flow control valves specifically described have the advantage that they provide precise and finely adjustable control of air flow. It has been found that over a substantial range of adjustment of the rotational position of the support stem the rate of air flow through the valve is proportional to the rotational position of the support stem.

The preferred embodiments described also have the advantage that they are very compact and of lightweight construction.

A further advantage possessed by the preferred embodiments is that the parts necessary to make any one of the embodiments are selected from a total of only seventeen different parts. Each of the embodiments described has an identical valve housing and by changing various parts any one of the embodiments described may be converted into one of the others.

The third embodiment of the present invention specifically described has the advantage that two valves, giving two-way control of air flow are incorporated in a single valve bore.

Advantageously, the support stems in the preferred control valves specifically described are provided with knurled knobs which enable adjustments to the position of the support stem in the valve bore to be made without the use of tools.

The flow control valves specifically described may advantageously be employed in the control of an I.S. glassware forming machine in place of the conventional spring or ball check valves, resulting in more precise and less restricted control of air flow to the various mechanisms of the glassware forming machine. This improved control results in more accurate speed regulation of the mechanisms of the glassware forming machine.

In addition to the improved control resulting from the use of the flow control valves specifically described in place of the conventional spring or ball check valves in a glassware forming machine, the flow control valves specifically described have the advantage that they are considerably more compact and lighter in weight than the spring or ball check valves which they may be used to replace.

Since any one of the preferred flow control valves described may be converted into one of the others and the parts necessary to make any one of the preferred flow control valves are selected from a total of seventeen parts, the preferred flow control valves are considerably more versatile than the conventional spring or ball check valves in a glassware forming machine. A conventional spring or ball check valve by comparison comprises over forty different parts and is only capable of one-way control of fluid flow.

Conventional spring or ball check valves require special tools to enable the needle valves in the spring and ball check valves to be set and located. The preferred flow control valves specifically described, in which the support stems are provided with knurled knobs, therefore have the further advantage over the conventional spring and ball check valves used in glassware forming machines that they require no special tools for adjustment.

We claim:

1. A flow control valve for controlling the rate of flow of gas in one direction through the valve comprising a housing having therein a bore with first and second ends, first and second ports communicating with the bore in the housing, the first port being a lesser distance from the first end of the bore than is the second port, a sleeve mounted within the bore and having a double conical seat located between the first and second ports and providing similar first and second valve seats of which the first valve seat is at a lesser distance from the first end of the bore than is the second valve seat, a support stem extending longitudinally within the bore, a valve member slidable along the support stem within the bore, a stop in a fixed position on the support stem within the bore, spring means carried by the support stem and biasing the valve member towards the said stop and towards one of the valve seats, and adjustable mounting means mounting the support stem in the first end of the bore and enabling longitudinal movement of the support stem relative to the bore to be effected whereby the stop may be positioned relative to one of the valve seats such that the valve member is biased into engagement with the stop by the spring means and a predetermined aperture is formed between the valve member and the said one of the valve seats for controlling the rate of flow of gas past the said one valve seat in a first direction but the valve member is able to move against the action of the spring means to permit a substantially unrestricted flow of gas past the valve seat in a direction opposite to the said first direction.

2. A flow control valve as defined in claim 1, wherein the valve member and the valve seat have mating frusto-conical surfaces.

3. A flow control valve as defined in claim 1, wherein the valve member is situated on the same side of the double conical seat as the adjustable mounting means and wherein the spring means biases the valve member in a direction away from the first end of the bore and towards the first valve seat.

4. A flow control valve as defined in claim 3 including a second adjustable mounting means located in the second end of the bore, a second support stem extending longitudinally within the bore and mounted in the second adjustable mounting means for longitudinal movement relative to the bore, a second stop in a fixed position on the second support stem within the bore, a second valve member slidable along the second support stem within the bore and situated on the same side of the double conical seat as the second adjustable mounting means, and second spring means carried by the second support stem and biasing the second valve member in a direction away from the second end of the bore towards the second valve seat and towards the second stop.

5. A flow control valve as defined in claim 4 in which the adjustable mounting means is similar to the second adjustable mounting means and is interchangeable therewith, the support stem is similar to the second support stem and is interchangeable therewith, the valve member is similar to the second valve member and is interchangeable therewith, and the spring means carried by the support stem is similar to the second spring means carried by the second support stem and is interchangeable therewith.

6. A flow control valve as defined in claim 1, wherein the valve member is situated on the opposite side of the double conical seat from the adjustable mounting means, the support stem extends through the double conical seat, the spring means carried by the support stem is positioned between the double conical seat and the second end of the bore, and the spring means biases the valve member towards the first end of the bore and towards the second valve seat.

7. A flow control valve for controlling the rate of flow of gas in one direction through the valve comprising, a housing having therein a bore with first and second ends and first and second ports communicating with the bore in the housing, the first port being a lesser distance from the first end of the bore than is the second port, a first valve seat located in a fixed position in the bore between the first and second ports, a first support stem extending longitudinally within the bore, a first movable valve member which is slidable along the first support stem within the bore, a first stop in a fixed position on the first support stem within the bore, first spring means positioned in the bore between the first valve member and the first end of the bore and acting to bias the first valve member towards the first valve seat and towards said first stop, first adjustable mounting means mounting the first support stem in the first end of the bore and enabling longitudinal movement of the first support stem relative to the bore to be effected whereby the position of the first stop relative to the first valve seat may be adjusted such that the first valve member is biased into engagement with the first stop by the first spring means and a predetermined aperture is formed between the first valve member and the first valve seat for controlling the rate of flow of gas past the first valve seat in a direction from the first port to the second port, the first valve member being movable against the action of the first spring means to permit a substantially unrestricted flow of gas past the first valve seat in a direction from the second port to the first port, a second valve seat in a fixed position in the bore between the first valve seat and the second port, a second support stem extending longitudinally within the bore between the second end of the bore and the second valve seat, a second movable valve member which is slidable along the second support stem within the bore and positioned within the bore between the second valve seat and the second port, a second stop in a fixed position on the second support stem within the bore, second spring means positioned in the bore between the second valve member and the second end of the bore and acting to bias the second valve member towards the second valve seat and towards the second stop, and second adjustable mounting means mounting the second support stem in the second end of the bore and enabling longitudinal movement of the second support stem relative to the bore to be effected whereby the position of the second stop relative to the second valve seat may be adjusted such that the second valve member is biased into engagement with the second stop by the second spring means and a predetermined aperture is formed between the second valve member and the second valve seat for controlling the rate of flow of gas past the second valve seat in a direction from the second port to the first port, the second valve member being movable against the action of the second spring means to permit a substantially unrestricted flow of gas past the second valve seat in a direction from the first port to the second port.

8. A flow control valve as defined in claim 7, wherein said first valve member is adapted to mate with said first valve seat, and said second valve member is adapted to mate with said second valve seat.

9. A flow control valve as defined in claim 8, wherein said first valve seat and said first valve member have mating frusto-conical surfaces, and said second valve seat and said second valve member have mating frusto-conical surfaces.

10. A flow control valve for controlling the rate of flow of fluid in at least one direction through the valve comprising a housing having therein a bore with first and second ends, first and second ports communicating with the bore in the housing, the first port being a lesser distance from the first end of the bore than is the second port, first and second valve seats located between the first and second ports, the first valve seat being the nearer of the valve seats to the first port and the second valve seat being the nearer of the valve seats to the second port, first and second valve members adapted to cooperate, respectively, with the first and second valve seats, first and second stops adapted to cooperate, respectively, with the first and second valve members, first and second biasing means for biasing the first and second valve members towards the valve seats and towards the stops with which they are adapted to cooperate, respectively, and first and second adjustable mounting means for adjusting the positions of the first and second stops, respectively, in relation to the first and second valve seats in order to vary the minimum spacing between the first and second valve members and the first and second valve seats, respectively, whereby the rates of flow of fluid through the valve in both directions between the first and second ports can be adjusted independently of one another.

11. A flow control valve as defined in claim 10, wherein each valve member is slidably mounted on a respective support stem, each support stem being movable relative to the valve seat with which its respective valve member is adapted to cooperate, each said support stem carrying the respective stop and spring means, which spring means constitutes the biasing means which biases the respective valve member towards the valve seat with which it is adapted to cooperate into engagement with its respective stop.

12. A flow control valve as defined in claim 11, wherein each valve member and the valve seat with which each valve member is adapted to cooperate, respectively, have mating frusto-conical surfaces.

* * * * *